INVENTORS
HILDING V. WILLIAMSON and
JAMES C. HESSON

United States Patent Office 2,758,016
Patented Aug. 7, 1956

2,758,016

APPARATUS FOR DISPENSING CHLORINE DIOXIDE

Hilding V. Williamson, Chicago, and James C. Hesson, Riverside, Ill., assignors to Cardox Corporation, Chicago, Ill., a corporation of Illinois Application December 28, 1953, Serial No. 400,605

6 Claims. (Cl. 23—282)

This invention relates to a method and apparatus for regenerating chlorine dioxide from solid chlorine dioxide hydrate to produce a dilute gaseous mixture of chlorine dioxide and an inert gas for use in treating flour and other materials.

Chlorine dioxide has, within recent years, replaced nitrogen trichloride as an agent for aging and improving grain and flour. Because of the unstable character of chlorine dioxide, it has heretofore been necessary to produce it at the point of use. This results in both technical and economic problems. In treating flour, for example, less than one gram and generally 0.2 to 0.75 gram of chlorine dioxide is used to treat 100 pounds of flour. Thus a mill producing 1000 hundred-weight of flour will generally use less than 750 grams (1.65 pounds) per day of chlorine dioxide. The direct production by known methods requires careful control and servicing by a skilled technician, often not available. The chemicals employed require careful handling, and if the chlorine dioxide concentration is allowed to become too great there is danger of explosions. The waste products often present a disposal problem. None of these problems are insurmountable if the daily production of chlorine dioxide were sufficient to justify constant attendance by skilled operators, but because of the small amount needed for the most part, the cost of this becomes prohibitive.

In a co-pending application Serial No. 266,814, now Patent No. 2,683,651, is described a method for producing chlorine dioxide hydrate which is non-explosive and can be prepared at a central point where control of the production of the chlorine dioxide used in making the hydrate can be controlled by skilled operators. The solid hydrate can be made into blocks or sold in containers having a known weight and predetermined chlorine dioxide content. The hydrate can be safely stored at low temperatures for long periods of time with negligible change in its chlorine dioxide content. It can be shipped, for example, by trucks to the mill and kept there under refrigeration in a device similar to the familiar home freezers. The chlorine dioxide can be generated from the blocks as needed, leaving a residue consisting of water, thus eliminating waste disposal problems.

It is an object of the present invention to provide an apparatus in the form of a compact unit, by which the chlorine dioxide contained in the solid hydrate can be safely and reliably regenerated, mixed with air, and supplied in the desired proportions to the flour-aging operation (or other operation) without the necessity of employing highly trained operators and with no danger of explosion. While the operation is herein described in connection with the aging of flour, it will be apparent that the process can be used wherever dilute gaseous mixtures of chlorine dioxide is useful.

Figure 1:
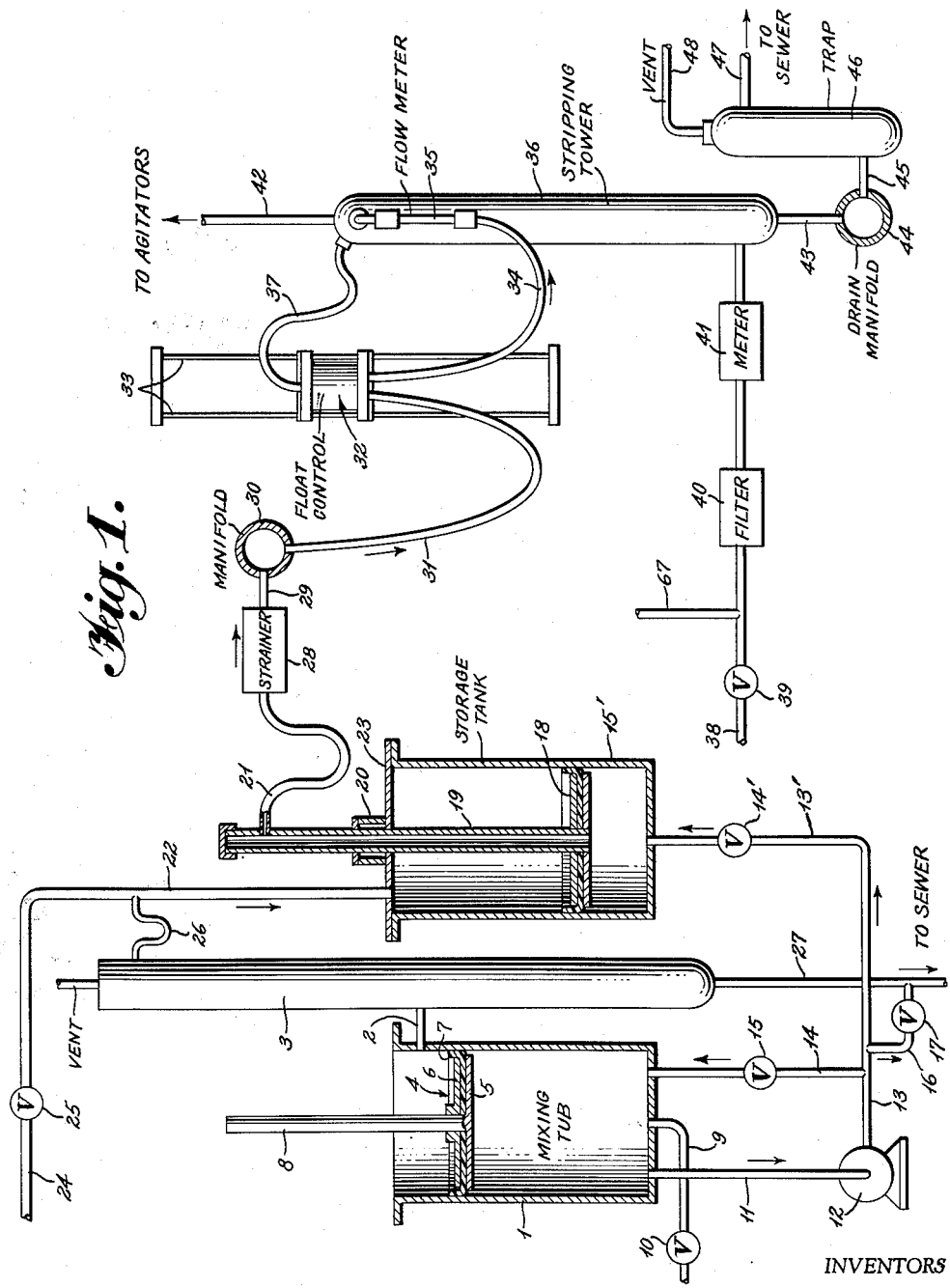
Figure 1 is a flow diagram showing the apparatus partly in section and in part diagrammatically.

Referring to Figure 1, a mixing tub 1 is provided. This may be of any suitable corrosion resistant material and is generally cylindrical in shape. The mixing tub is provided with an overflow line 2 leading to a vent pipe 3. The vessel is fitted with a piston 4 which may comprise a lower plate 5 which is of a diameter just sufficiently smaller than the diameter of the tub to permit its being moved readily upward and downward in the tub. An upper plate 6 of slightly lesser diameter than plate 5 is provided. Between the two and extending between the edges of plate 6 and the walls of the vessel to a point above plate 6 is a sheet of flexible material 7. This is generally of plastic and may suitably be of polyethylene. Its purpose is to form a liquid tight seal between the piston elements and the walls of the vessel. The lower plate 5 and upper plate 6 may be connected by any suitable means to secure the diaphragm 7 in position. A vertical rod 8 is attached by suitable means to plate 6.

In operation water is introduced into the tub through line 9 and valve 10 forcing the piston upward and the air out through line 2. Water is introduced until it overflows through line 2. Line 2 is positioned so that when filled to this point the vessel contains a known volume of water.

The piston is removed from the mixing tub by means of handle 8. A known weight of chlorine dioxide hydrate of known composition is introduced and the piston restored in the tub. The hydrate is suitably in block form and, being heavier than water, sinks to the bottom. The water is then circulated in the tub by pumping it through line 11, pump 12, line 13, line 14 and valve 15. This causes rapid circulation of the water and dissolves the solid hydrate within a short time. The contents of tub 1 are normally above 50° F. but below about 100° F. in order to insure rapid dissolution of the hydrate. In commercial operation the hydrate is supplied in polyethylene containers holding nine pounds of hydrate having about 16% to 17% chlorine dioxide content. This may be added to the tub merely by removing the lid from the package and dropping the container and contents into the tub. The tub is typically designed to hold about 170 pounds of water and as a consequence the resultant solution has about 0.9% chlorine dioxide dissolved therein.

After the hydrate is dissolved it is passed through line 13' and valve 14' into the bottom of the storage tank 15'. The suction caused by removal of the solution causes the piston to move downwardly simultaneously. A few inches of water may be introduced into the tub above the piston to prevent the possibility of air being drawn past the diaphragm. This has the further advantage of diluting any solution which may have escaped past the diaphragm, thus minimizing or eliminating noxious odors in the atmosphere. When the transfer is complete valve 14' is closed and the mixing tub 1 may be filled with water through line 9 and valve 10, thus forcing the piston up until water overflows through line 2, thus diluting the small amount of solution remaining, and preparing the tub for mixing the next batch of solution. The tub 1 can be drained to the sewer through line 16 and valve 17 when necessary.

Tank 15' is provided with a piston 18 which is similar to that described in connection with piston 4 except for one feature. A vertical pipe 19, which is capped as shown, extends through the piston opening into the lower part of the storage tank. The pipe extends through a bushing 20 and near the top is connected with a flexible tube 21 which is sufficiently long to accommodate the vertical movement of the piston. When the solution is transferred from tub 1 into the bottom part of the storage tank 15' the piston 18 is forced upwardly. When transfer is complete, valve 14' is closed and the pump stopped after rinsing by circulating water through it from the mixing tub.

The upper part of the storage tank above the piston is filled with water which is introduced through standpipe 22 which extends through lid 23 of the vessel. Water is added to the standpipe through line 24 and valve 25 so that the standpipe 22 is filled to the level of trap 26 connecting with the vent pipe 3, thus imposing a hydraulic head on the piston, causing it to move downwardly. The vent pipe may be opened to the atmosphere or connected to a stack. Any liquid flowing into the vent pipe 3 passes through line 27 to the sewer. The solution is forced by virtue of the downward movement of the piston, through line 21, strainer 28 which is provided to remove any solid particles of foreign material which might be present and which might interfere with the operation of other parts of the apparatus. This may suitably be a series of woven glass or plastic screen. Solution passes through line 29 to a manifold 30 from whence it is distributed to a plurality of stripping towers usually four to six in number. The present apparatus is described in connection with only a single unit but it is clear that multiple units of similar construction could be used. The solution passes from the manifold 30 through line 31, which is of flexible tubing e. g. polyethylene, to a float control 32 which is mounted for vertical sliding movement on the guide and supporting frame 33. Both of these will be described in greater detail in connection with Figure 3. From the float control the solution passes through line 34 to a rotameter 35 and thence into the top of stripping tower 36. The inlet to tower 36 is about 15 inches or more below trap 26. The stripping tower may be filled with suitable material to promote contact of liquid and air or other inert gas, these including marbles, Berl saddles and the like. The top of the float control chamber is connected through flexible tubing 37 with the top of the stripping tower at a point above that at which the solution is introduced into the tower to equalize the pressure, this being about three inches of water above atmospheric at these points. Lines 31 and 34 are also of flexible tubing such as polyethylene and are of sufficient length to permit the full movement of the float control device 32 either upward or downward. The flow of solution is controlled by the position of float control 32 with respect to the point of introduction of liquid into stripping tower 36. As shown, the control is in position to deliver solution to the tower. When lowered below the level of the inlet to tower 36 flow ceases. Full flow is attained when the float chamber is about six inches above this inlet point. The float chamber will receive proper flow from tank 15 as long as it is nine inches or more below trap 26, when the air pressure in the top of the tower 36 is about three inches of water above atmospheric. The position of the float is adjusted to provide the exact amount of solution of known concentration of chlorine dioxide required for the flour treatment or other use. The flowmeter 35 may be calibrated, either in terms of cubic centimeters of solution delivered per minute or, since the chlorine dioxide concentration is maintained constant, in terms of grams of chlorine dioxide delivered for any desired unit of time.

It will be apparent that when multiple stripping units are provided, each being connected with manifold 30, similar controls fo reach tower will be required. It will be seen that each tower can be individually and independently controlled.

Air is introduced near the bottom of the tower 36 through line 38, valve 39, which may also be a pressure regulator, filter 40 and meter 41. The gas passes upwardly countercurrent to the downwardly flowing solution and the mixture of air and chlorine dioxide which is normally about 0.5% to about 1% by volume of chlorine dioxide, passes through line 42 to the flour agitators. A manifold may be provided to supply air to a plurality of units.

The amount of air supplied may vary within wide limits, it only being necessary to supply enough air to substantially completely strip the downwardly flowing solution. Normally this would be in the neighborhood of about 200 to 500 cubic feet per hour, although this depends upon the concentration of the solution and the concentration of chlorine dioxide desired in the final gas mixture. The volume ratio of air, or other inert gas, to volume of solution stripped will be illustrated more fully later. The essential control is with respect to the amount of solution furnished to any given tower, and it is unnecessary to accurately meter the air.

The water, substantially free of chlorine dioxide, passes from tower 36 through line 43 to a drain manifold 44 to which the other towers in the system may also be connected. The manifold is connected by way of line 45 to a trap 46 and thence through line 47 to the sewer. The trap is vented at 48 to prevent siphoning of water from the tower. It will be noted that the relationship of the trap to the tower is such as to maintain a liquid seal in the bottom of tower 36 at a level with the outlet 47 from the trap.

Figure 2:
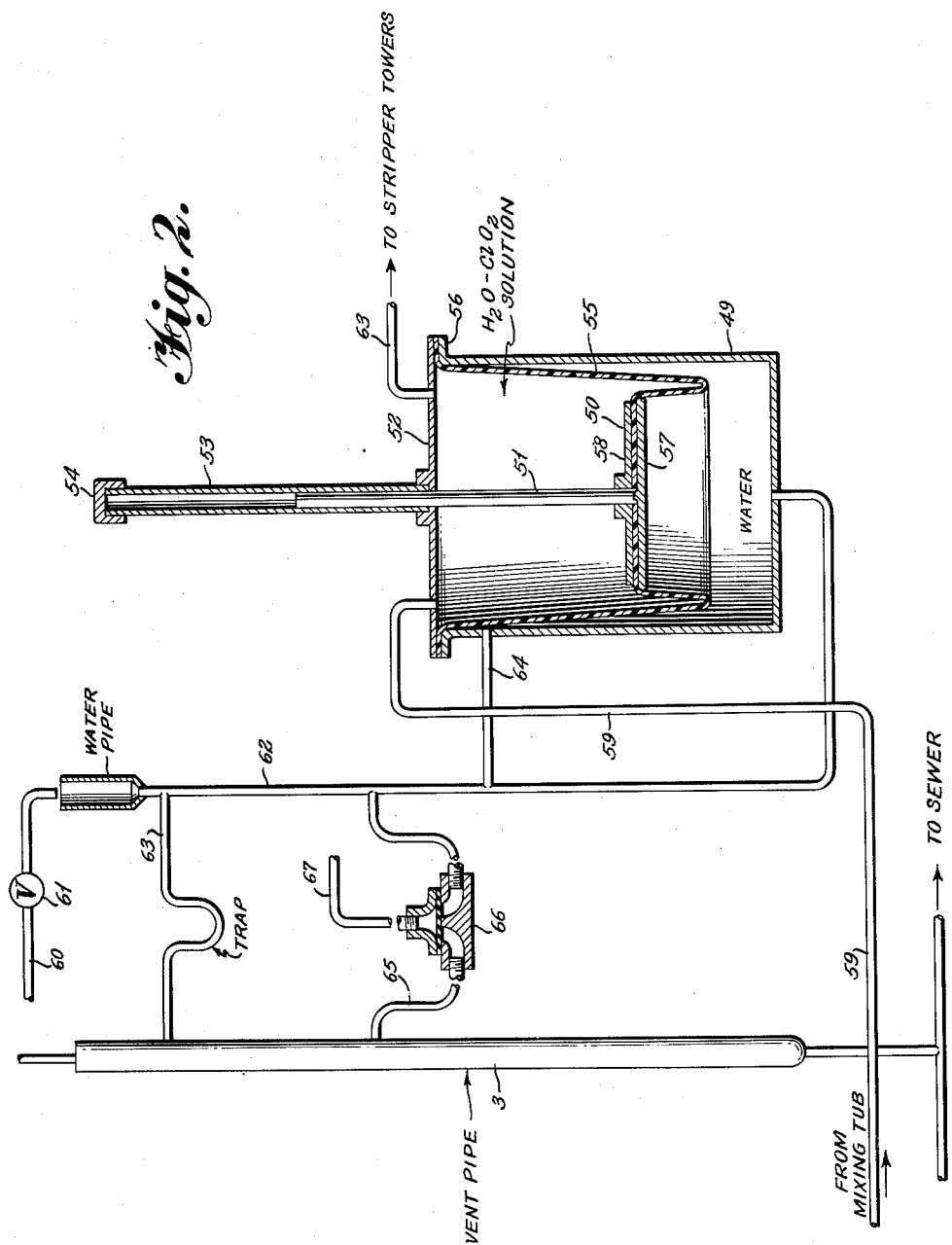
Figure 2 shows a modification of the storage tank and necessary modifications in the piping diagram.

As an alternative to the storage tank 15', a tank of the structure shown in Figure 2, may be employed. In this case the tank 49 is provided with a loosely fitting piston 50 to which a rod 51 is coaxially attached. The guide rod passes upwardly through the top 52 of the tank into the guide pipe 53 which is capped at 54.

A plastic bag 55 may be secured at the top of the tank between the top 52 and flange 56. The bottom of the bag is draped over the bottom of plate 57 of the piston 50 and may be held in position by the plate 58 which may be secured by bolts or the like extending through the bag into the plate 57. The guide rod 51 is attached to the plate 58. It will thus be noted that the storage tank 49 is divided into two compartments. Solution from the mixing tub may be introduced into the top compartment, that is, into the plastic bag through line 59 extending through the top of the storage tank 49, in a manner similar to that described in connection with Figure 1.

In order to force the solution from the storage vessel 49, water is introduced through line 60 and valve 61 into the water standpipe 62 from whence it passes into the bottom compartment of storage tank 49. A column of water of sufficient height is provided so as to force the piston 50 upward. The hydraulic head relationships for this modification are similar to those described in connection with Figure 1. The solution is then forced through line 63 to the manifold, the remainder of the operation being as described in connection with Figure 1. A line 64 connects the top of the storage vessel to the water-pipe 62 so that if there is any air trapped between the walls of the vessel and the plastic bag it will pass out and bubble up through the water in the waterpipe. The waterpipe 62 is connected through a trap 63 to the ventpipe 3, at the desired level for a hydraulic head sufficient to operate the piston 50 and force the solution from the tank 49. A second trap 65 provided with an air controlled diaphragm valve 66 is connected slightly above the level of the tank 49. The valve is connected through line 67 to the air supply line 38 which holds the valve closed. In the event of air supply failure to cut-off, pressure on the diaphragm is relieved and water from standpipe 62 can pass to the drain. Since this eliminates the hydraulic head, flow of solution to the stripping towers automatically ceases. This feature is optional. When the tank 49 is being filled with solution from the mixing tub, air pressure on valve 66 conveniently may be released and the water in the bottom compartment forced back through line 64 and thence through line 62 and trap 65 to the ventpipe from whence it runs to the sewer.

Figure 3:
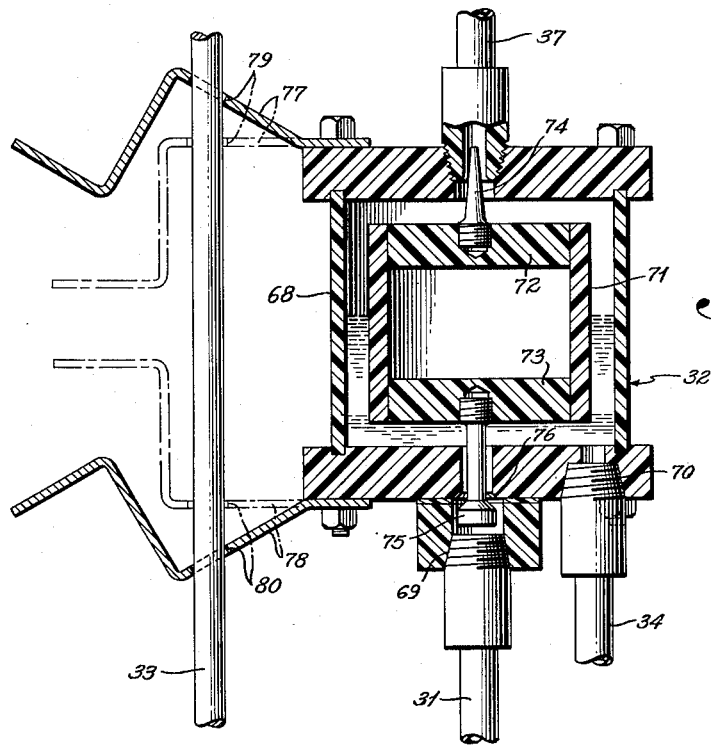
Figure 3 is a side view in elevation of the float control used to regulate flow of solution.
Figure 4:
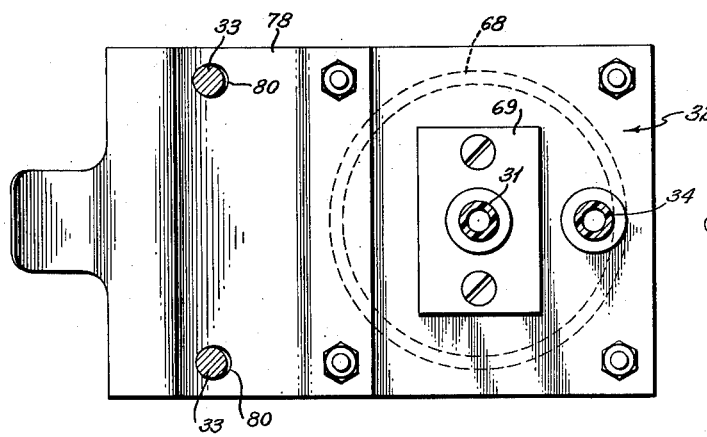
Figure 4 is a bottom view of the float control.

The construction of the float control is shown in Figure 3.

The float control comprises a cylindrical body 68 of transparent Lucite having an inlet 69 to which line 31 may be attached. An outlet 70 is provided for attachment of line 34. Line 37 is attached at the top to provide for the equalizing of the pressure within the float chamber and at the top of the tower 36. The float comprises a polyethylene cylinder 71 in which are pressed the end pieces 72 and 73. A guide member 74 extends from the end member 72 part way into the port to which line 37 is attached. A valve member 75 is screwed into the lower end member 73 of the float, the lower end being shaped to a seat at 76.

A pair of spring clips 77 and 78 are attached to one side of the upper and lower ends of the float chamber, these normally assuming the position shown by the solid lines. A pair of rods 33 pass through the apertures 79 and 80. Due to the binding action of the clips pressing against the rods, the control device is held in position at any point on the rods. When the clips are manually pressed together as shown by the broken lines there is sufficient clearance in the apertures 79 and 80 to permit the device to be slidably raised or lowered to any desired position.

The operation of the float control has been previously referred to. When liquid is permitted to flow into the float chamber the float member floats a little less than half way out of the liquid. Thus, when the liquid reaches a height slightly more than half way up the side of the float, the float rises and seats the end of valve 75 against the seat 76. If the entire device is raised until this level is above the inlet of line 34 into tower 36, liquid flows from the float chamber and the level drops slightly unseating the valve. Additional liquid flows into the chamber as rapidly as it is withdrawn and the liquid level is maintained at a constant value. The rate of flow of liquid into the tower 36 is proportional to the height the liquid level in the float chamber is above the point of admission into tower 36. Thus the rate of flow is governed by adjusting the height of the float chamber above the point of solution discharge in the tower 36. If the device is lowered below this point, no liquid can flow through line 34, and the valve remains closed.

There are several advantages for the use of the present apparatus. It will be noted that the solution, both in the mixing vessel and the storage tank is maintained out of contact with air. Chlorine dioxide decomposes much more rapidly in the vapor phase than it does in solution. Since the apparatus precludes any vapor space, decomposition in the gas phase is prevented. Decomposition in the solution phase is negligible in the length of time the solution is stored in normal operation, this generally being less than one to three days. Moreover, the apparatus provides for more flexible operation in that relatively strong solutions of chlorine dioxide up to as much as 2% to 2.5% can be employed. If solutions of this concentration were employed in an apparatus having a vapor space above the liquid, explosive mixtures of chlorine dioxide and air could form. At 0.9% concentration of chlorine dioxide in the solution the maximum percentage of chlorine dioxide in a vapor space at equilibrium would be about 10%, which is the lower limit of the explosive mixtures. With solutions of higher concentrations the proportion of chlorine dioxide in the vapor phase increases within the explosive range so that a solution could not be used of much greater strength than 1% without inviting possible hazard. However, in the present apparatus, since no vapor space exists, concentrated solutions can be employed.

The apparatus also has the advantage that it is unnecessary to use a continuously acting pump. A quantity of liquid can be prepared at one time which is adequate for from one to three days of normal operation. The only time the pump would be in operation would be during the period of agitation to dissolve the hydrate and the short interval needed to pass the resultant solution to the storage tank. All solution from that point on is transferred from the storage tank by means of displacement of the piston under the hydraulic head of water. It is, of course, within the scope of the invention to provide the water under carefully regulated pressure by means known to the art, rather than by virtue of the hydraulic pressure applied to the piston.

The ratio of stripping air to solution is dependent on the stripping temperature, concentration of solution and concentration of chlorine dioxide desired in the final gas mixture. This is shown in Table I.

TABLE I

| Run No. | Solution, $ClO_2$, Wt. Percent | Volume Ratio, Air/Soln. | Exit Gas, $ClO_2$, Vol. Percent | Chlorine Dioxide Recovery, Wt. Percent |
| --- | --- | --- | --- | --- |
| 1 | 0.48 | 20 | 4.9 | 81 |
|   |      | 86 | 2.01 | 87 |
|   |      | 120 | 1.33 | 91 |
|   |      | 185 | 0.84 | 91 |
|   |      | 300 | 0.46 | 91 |
|   |      | 600 | 0.23 | 91 |
| 2 | 1.12 | 20 | 10.32 | 71 |
|   |      | 120 | 1.95 | 88 |
|   |      | 217 | 1.10 | 89 |
|   |      | 285 | 0.81 | 92 |
|   |      | 610 | 0.37 | 96 |
| 3 | 1.87 | 23 | 14.08 | 72 |
|   |      | 120 | 3.50 | 94 |
|   |      | 300 | 1.31 | 97 |
|   |      | 600 | 0.74 | 98 |

The determinations were made experimentally by passing solution and air at 77° F. through a glass column one inch in diameter and packed with eleven inches of 3/16 inch glass helices. The solution was fed at a rate of 6.33 cc. a minute. The efficiency of recovery can be improved by increasing the length of the packed section since in the apparatus used the spent solution still contained some chlorine dioxide.

In the preferred operation a gas mixture is produced containing about 1% by volume of chlorine dioxide by stripping a solution of about 1% concentration, the exit gas being diluted with air of low humidity, to about 0.5% chlorine dioxide concentration before being passed to the agitators. The volume ratio of air to solution through the stripper is in the range of about 200–300 to one. The selection of these conditions is based upon overall factors of plant design and operation as well as the particular end use requirements. Other use requirements or changes in plant design might dictate selection of other conditions as will be apparent.

Having described our invention but without being restricted to the exact embodiments described, we claim as our invention:

1. An apparatus for preparing a dilute mixture of chlorine dioxide and air from chlorine dioxide hydrate which comprises a mixing tank, means for filling the tank with water, a vertically movable piston in said tank, means on the piston to provide a seal between the piston and the walls of the tank, means for agitating the contents of the tank to dissolve chlorine dioxide hydrate, a storage tank, means for transferring the solution from the mixing tank to the storage tank including a pipe connecting said mixing tank and said storage tank, said storage tank comprising vertically displaceable means mounted therein dividing it into a water compartment and a solution storage compartment, a stripping tower, a conduit connecting the storage compartment to the top of said stripping tower, means for introducing water at constant pressure into the water compartment to displace the displaceable means and force solution from the solution compartment through said conduit as the sole means for transferring solution from the storage compartment to said tower, flow control means and flow metering means in said conduit, means for introducing air near the bottom of said tower to pass it countercurrent to said solution, means from the top of the tower for passing the resultant air-chlorine dioxide mixture to a point of use, and means for withdrawing stripped water from the bottom of the tower.

2. The apparatus of claim 1 wherein the displaceable means in the storage tank is a piston including means forming a close seal between it and the walls of the storage tank.

3. The apparatus of claim 1 wherein the displaceable means in the storage tank is a piston including means forming a seal between it and the walls of the storage tank, and wherein the piston rod is a pipe through which solution is forced from the storage tank as the piston is displaced.

4. The apparatus of claim 1 wherein the displaceable means in the storage tank comprises a collapsible plastic bag mounted on a vertically displaceable piston of substantially lesser diameter than the tank.

5. The apparatus of claim 1 wherein the flow control means comprises a float control, a supporting means therefor and means for vertically adjusting said float control in relation to the inlet of said stripping tower thereby to regulate the flow of solution to said tower.

6. An apparatus for preparing a dilute mixture of chlorine dioxide and air from chlorine dioxide hydrate which comprises a mixing tank, means for filling the tank with water, a vertically movable piston in said tank, means on the piston to provide a seal between the piston and the walls of the tank, means for agitating the contents of the tank to dissolve chlorine dioxide hydrate, a storage tank, means for transferring the solution from the mixing tank to the storage tank including a pipe connecting said mixing tank and said storage tank, said storage tank comprising vertically displaceable means mounted therein dividing it into a water compartment and a solution storage compartment, a stripping tower, a conduit connecting the storage compartment to the top of said stripping tower, means for maintaining a constant hydraulic head on said displaceable means to displace it as the sole means of causing flow of solution from said solution storage compartment through said conduit and into the top of said stripping tower, flow control means and flow metering means in said conduit, means for introducing air near the bottom of said tower to pass it countercurrent to said solution, means from the top of the tower for passing the resultant air-chlorine dioxide mixture to a point of use, and means for withdrawing stripped water from the bottom of the tower.

References Cited in the file of this patent

UNITED STATES PATENTS

| | | |
|---|---|---|
| 2,630,248 | Hinz | Mar. 3, 1953 |

FOREIGN PATENTS

| | | |
|---|---|---|
| 563,940 | Great Britain | Sept. 6, 1944 |